(12) United States Patent
Park

(10) Patent No.: US 7,983,029 B2
(45) Date of Patent: Jul. 19, 2011

(54) SUPPORT DEVICE FOR DISPLAY UNIT AND DISPLAY UNIT HAVING THE SAME

(75) Inventor: Jae Hoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 12/020,088

(22) Filed: Jan. 25, 2008

(65) Prior Publication Data
US 2008/0239640 A1 Oct. 2, 2008

(30) Foreign Application Priority Data

Mar. 29, 2007 (KR) ........................ 10-2007-0030752

(51) Int. Cl.
*H05K 7/14* (2006.01)
(52) U.S. Cl. ......... 361/679.22; 361/679.21; 361/679.01; 248/917; 349/58; 362/566; 362/581; 362/311.01; 362/311.02; 174/88.1
(58) Field of Classification Search ............ 361/679.21, 361/679.22, 679.01, 679.02, 679.26; 248/917–924; 362/566, 581, 311.01, 311.02; 349/58; 174/88.1
See application file for complete search history.

(56) References Cited

U.S. PATENT DOCUMENTS

| | | | |
|---|---|---|---|
| 4,942,498 A | | 7/1990 | Toussaint |
| 5,257,917 A | * | 11/1993 | Minarik et al. ............. 417/475 |
| 5,786,665 A | * | 7/1998 | Ohtsuki et al. .............. 313/512 |
| 6,491,412 B1 | * | 12/2002 | Bowman et al. ............. 362/241 |
| 6,561,668 B2 | * | 5/2003 | Katayama et al. ............. 362/85 |
| 6,729,746 B2 | * | 5/2004 | Suehiro et al. ................ 362/241 |
| 6,746,131 B1 | * | 6/2004 | Goldstein et al. ............. 362/96 |
| 7,088,577 B2 | * | 8/2006 | Lauffer et al. ........... 361/679.21 |
| 2003/0002246 A1 | | 1/2003 | Kerr |
| 2005/0073517 A1 | | 4/2005 | Wu et al. |
| 2007/0247873 A1 | * | 10/2007 | Awai et al. ..................... 362/618 |

FOREIGN PATENT DOCUMENTS

| | | |
|---|---|---|
| EP | 1595474 A1 | 11/2005 |
| GB | 2376398 A | 12/2002 |
| JP | 2002-369103 A | 12/2002 |

OTHER PUBLICATIONS

Communication (Extended European Search) dated Aug. 2, 2010, in counterpart European Application No. 08102157.8.

* cited by examiner

*Primary Examiner* — Jayprakash N Gandhi
*Assistant Examiner* — Ingrid Wright
(74) *Attorney, Agent, or Firm* — Sughrue Mion, PLLC

(57) ABSTRACT

A support device for a display unit is provided, in which supports for supporting the display unit are hidden so as to improve the beauty of a room, and a display unit having the same. The support device includes at least one support connected to the display unit; a base connected to the lower part of the support; and a transparent member installed in front of the support, wherein the transparent member includes at least one refractively transmitting portion for refracting light, incident from the front of the transparent member to the support, toward external regions of the support.

22 Claims, 10 Drawing Sheets

SUPPORT DEVICE FOR DISPLAY UNIT AND DISPLAY UNIT HAVING THE SAME

CROSS-REFERENCE TO RELATED APPLICATIONS

This application claims priority from Korean Patent Application No. 2007-0030752, filed Mar. 29, 2007, in the Korean Intellectual Property Office, the disclosure of which is incorporated herein by reference.

BACKGROUND OF THE INVENTION

1. Field of the Invention

Apparatuses consistent with the present invention relate to a support device for a display unit and a display unit having the same and, more particularly, to a support device for a display unit, in which supports and wires, connected to the support device and the display unit, are hidden, and a display unit having the support device.

2. Description of the Related Art

Recently, display units, such as LCDs and PDPs, have a large screen size and a small thickness, thus being popular with many users. The display units have an excellent picture quality, and reduce the size of a space occupied thereby due to the small thickness. These display units may be attached directly to the surface of the wall of a room, or be installed on the floor of a room or the upper surface of a table in the room using a separate support device.

Korean Patent Laid-open Publication No. 10-2007-0021768 discloses a support device for standing a panel-type display unit on the floor of a room. The support device includes pedestals laid on the floor in a spread state, and supports extended upwardly from the pedestals and connected to the rear surface of the display unit.

Since the supports connecting the pedestals and the display unit are exposed to a user's eyes, the above support device may spoil the beauty of the room. That is, in the case that the supports have a color, which does not match with the color of the room, the support device spoils the beauty of the room.

Further, since the support device cannot accommodate wires connected to the display unit, the wires connected to the display unit are exposed to user's eyes. The exposed wires are unsightly and may also spoil the beauty of the room.

SUMMARY OF THE INVENTION

Therefore, exemplary embodiments of the invention provide a support device for a display unit, in which supports for supporting the display unit are hidden so as to improve the beauty of a room, and a display unit having the same.

Exemplary embodiments of the invention also provide a support device for a display unit, in which wires as well as supports are hidden together, and a display unit having the same.

In accordance with one aspect, the present invention provides a support device for a display unit comprising at least one support connected to the display unit; a base connected to a lower part of the support; and a transparent member installed in front of the support, wherein the transparent member includes at least one refractively transmitting portion which refracts light, incident from the front of the transparent member to the support, toward external regions of the support.

The refractively transmitting portion may include inclined surfaces having a gradient against the incidence direction of light.

The transparent member may further includes straightly transmitting portions for straightly transmitting light incident from the front of the transparent member; and the refractively transmitting portion having a width larger than that of the support is provided in front of the support and the straightly transmitting portions may be provided at both sides of the refractively transmitting portion.

The at least one support may include a first support and a second support, which are provided at separated positions; and the at least one refractively transmitting portion may include a first refractively transmitting portion and a second refractively transmitting portion, which are respectively provided in front of the first and second supports.

The transparent member may further include a support receiving portion formed in the rear of the refractively transmitting portion so as to accommodate the support.

The support may include a wire receiving portion for receiving wires.

The transparent member may further include a liquid containing portion formed therein for containing a liquid.

The support device may further comprise a luminous body installed at one side of the transparent member for irradiating light onto the transparent member.

In accordance with another aspect, the present invention provides a support device for a display unit comprising a transparent member connected to the display unit for supporting the display unit; and a base installed at a lower part of the transparent member, wherein the transparent member includes wire receiving portions provided in the rear surface thereof for receiving wires, and refractively transmitting portions which refracts light, incident from the front of the transparent member to the wire receiving portions, toward external regions of the wire receiving portions.

In accordance with another aspect, the present invention provides a display unit comprising a main body having a screen; and a support device supporting the main body, and comprising at least one support connected to the display unit, a pedestal connected to the lower part of the support, and a transparent member installed in front of the support, wherein the transparent member includes at least one refractively transmitting portion for refracting light, incident from the front of the transparent member to the support, toward external regions of the support.

In accordance with yet another aspect, the present invention provides a display unit comprising a main body having a screen; and a support device which supports the main body, and comprises a transparent member provided with the upper part connected to the main body and a base installed at a lower part of the transparent member, wherein the transparent member includes wire receiving portions provided in the rear surface thereof for receiving wires, and refractively transmitting portions which refracts light, incident from the front of the transparent member to the wire receiving portions, toward external regions of the wire receiving portions.

BRIEF DESCRIPTION OF THE DRAWINGS

These and/or other aspects and advantages of the invention will become apparent and more readily appreciated from the following description of exemplary embodiments, taken in conjunction with the accompanying drawings, in which.

DETAILED DESCRIPTION OF THE EXEMPLARY EMBODIMENTS

Figure 1:
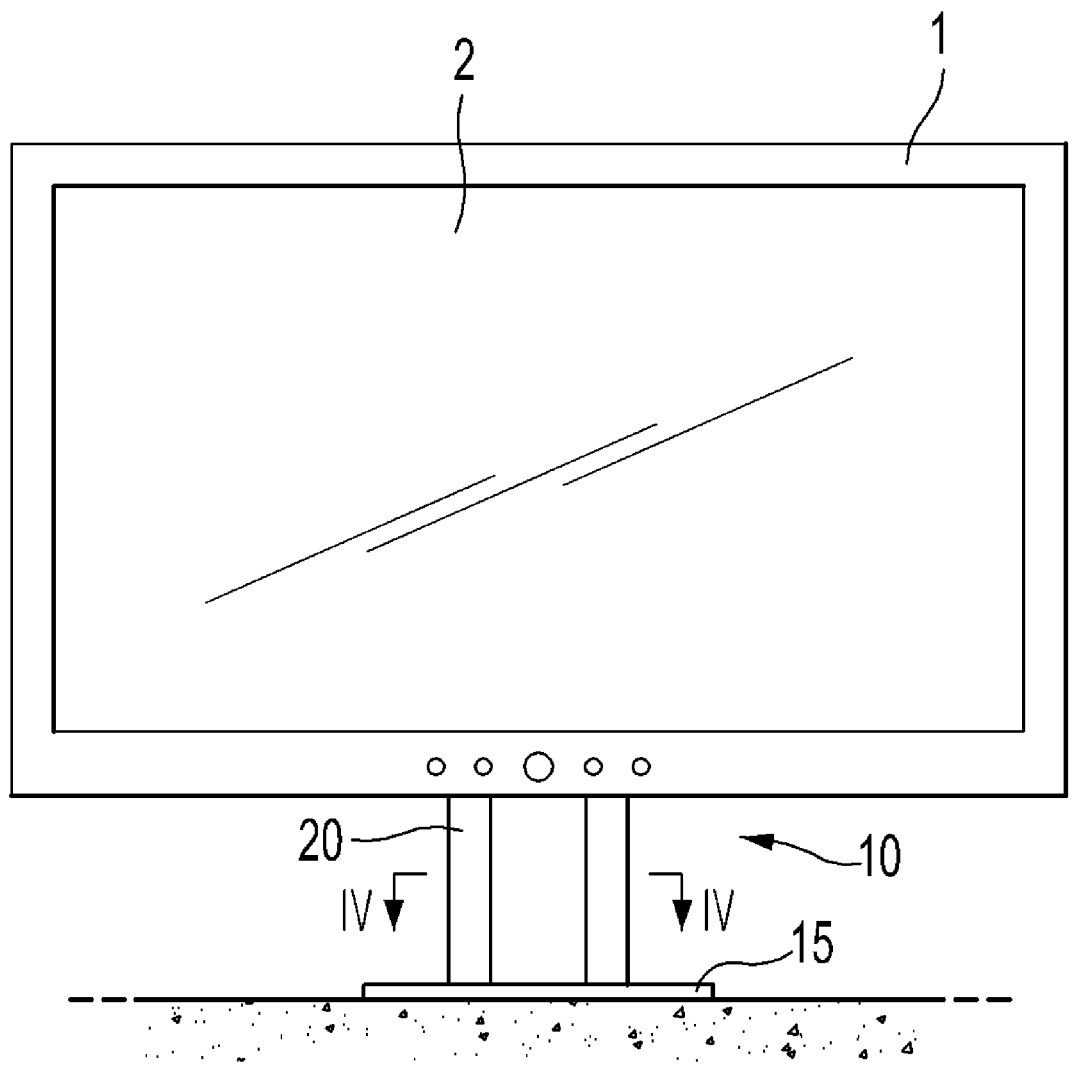
FIG. 1 is a front view of a display unit, to which a support device in accordance with a first embodiment of the present invention is applied.

Reference will now be made in detail to exemplary embodiments of the present invention, an example of which is illustrated in the accompanying drawings, wherein like reference numerals refer to like elements throughout. The embodiments are described below to explain the present invention by referring to the accompanying drawings.

Figure 2:
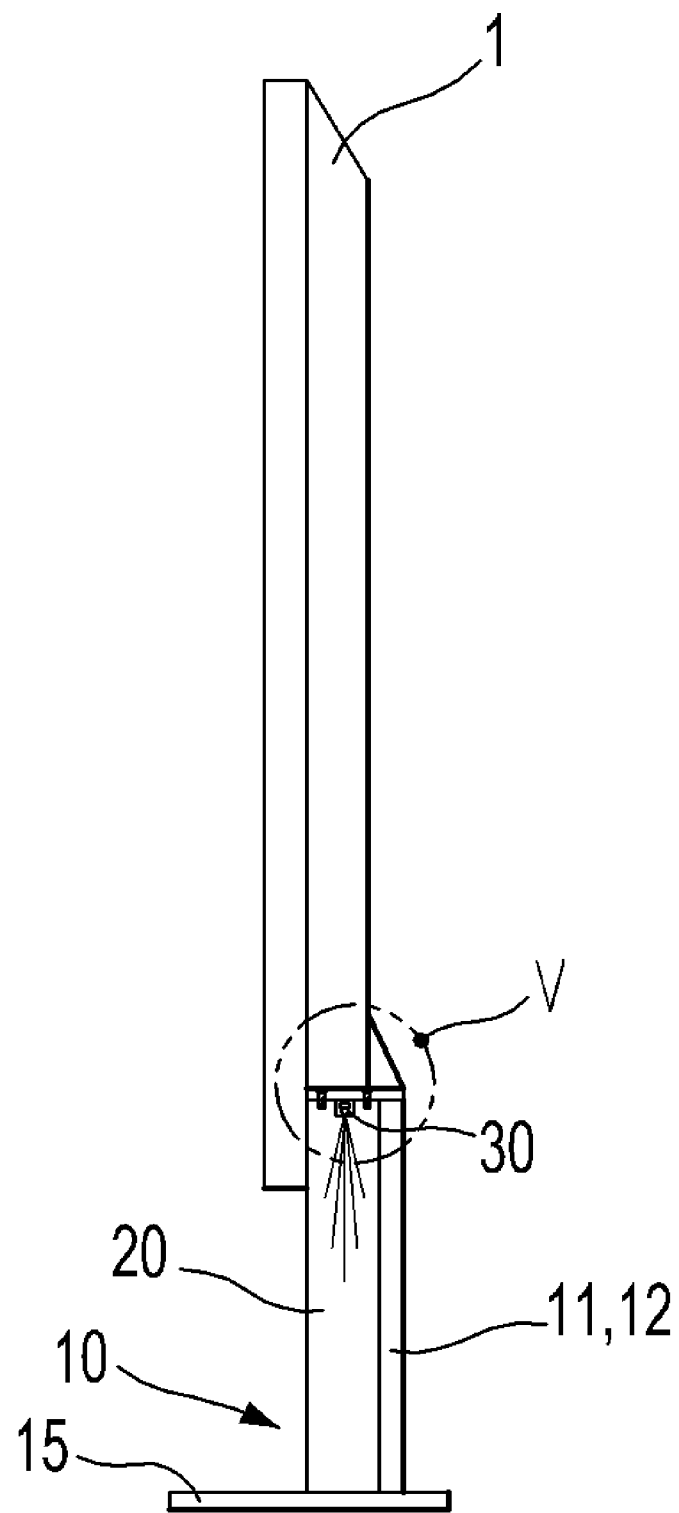
FIG. 2 is a side view of the display unit of FIG. 1.

FIGS. 1 and 2 illustrate a display unit, to which a support device in accordance with a first embodiment of the present invention is applied. A display unit includes a main body 1 having a screen 2, and a support device 10 for supporting the main body 1 in an upright position. Here, the main body 1 is a thin-type TV, such as a liquid crystal display (LCD) or a plasma display panel (PDP).

Figure 3:
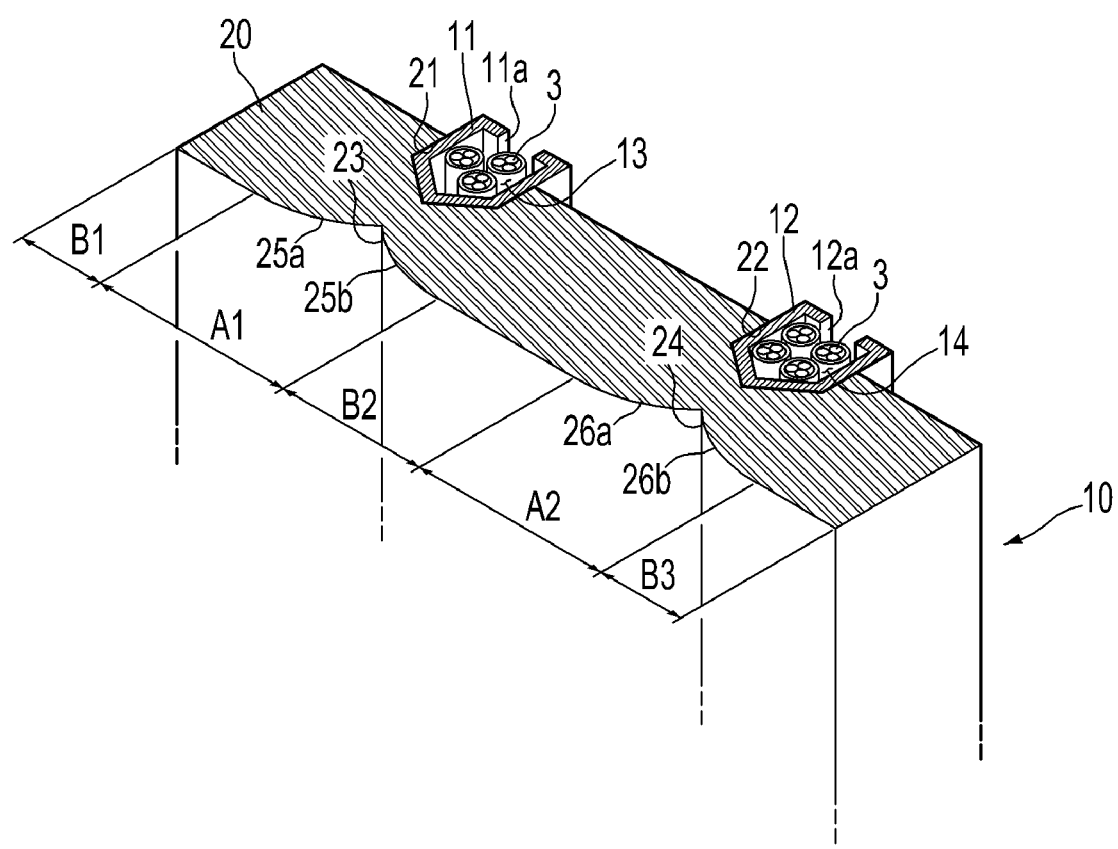
FIG. 3 is a perspective view of the support device of the display unit of FIG. 1, illustrating supports and a transparent member.

The support device 10, as shown in FIGS. 2 and 3, includes first and second supports 11 and 12, upper parts of which are connected to the rear surface or both sides of the lower part of the main body 1, a pedestal or base 15 connected to the lower ends of the first and second supports 11 and 12, and a transparent member 20 installed at the front parts of the first and second supports 11 and 12 for hiding the first and second supports 11 and 12.

Figure 4:
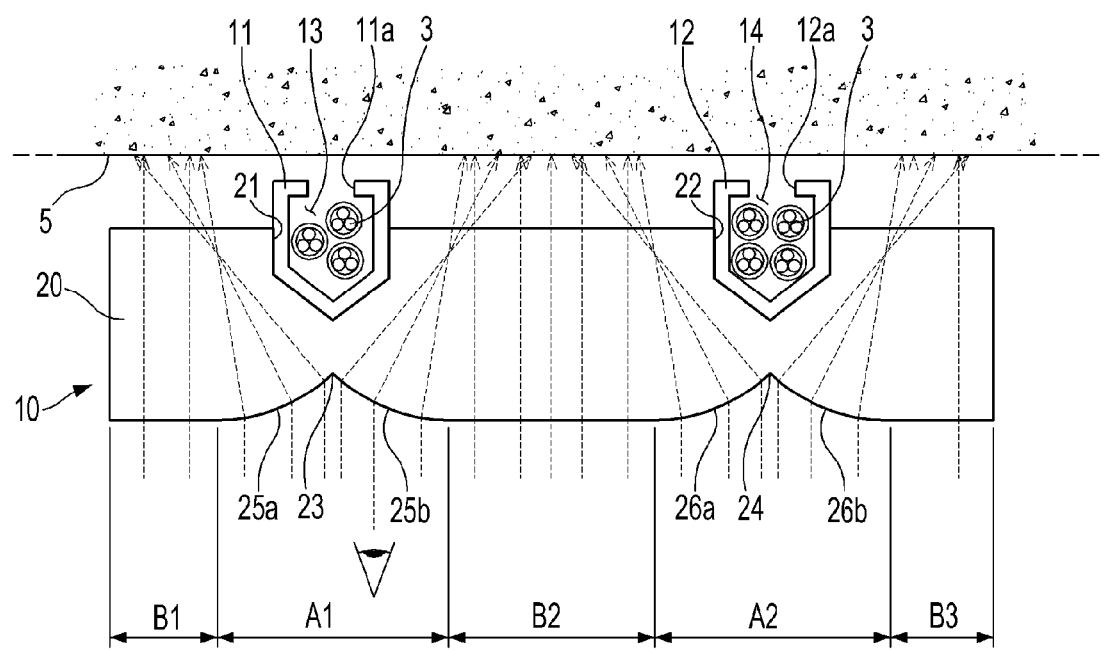
FIG. 4 is a sectional view of FIG. 1 taken along the line IV-IV'.

The first and second supports 11 and 12, which are separated from each other, are installed at both sides, as shown in FIGS. 3 and 4, and are made of a metal having rigidity enough to stably support the main body 1, such as steel or aluminum. Wire receiving portions 13 and 14 for receiving wires 3 are formed in the first and second supports 11 and 12, and openings 11a and 12a, through which the wires 3 are put into the wire receiving portions 13 and 14, are formed through the rear parts of the first and second supports 11 and 12. The openings 11a and 12a are extended in the lengthwise direction of the first and second supports 11 and 12.

The transparent member 20 is made of a transparent material, which can transmit light. That is, the transparent member 20 is made of, for example, polycarbonate (PC), acryl, ABS resin, or glass. As shown in FIG. 4, the transparent member 20 has a width, which is larger than the interval between the first and second supports 11 and 12, and a length, which is approximately the same as the length of the first and second supports 11 and 12. Accordingly, when the transparent member 20 is installed at the front parts of the first and second supports 11 and 12, the first and second supports 11 and 12 are hidden by the transparent member 20.

First and second support receiving portions 21 and 22 for respectively receiving the first and second supports 11 and 12 are formed in both sides of the rear surface of the transparent member 20. The first and second support receiving portions 21 and 22 accommodate most parts of the first and second supports 11 and 12, thus surrounding front parts and both side parts of the first and second supports 11 and 12. When the transparent member 20 is installed in the above manner, the transparent member 20 together with the first and second supports 11 and 12 supports the main body 1, thus reinforcing the rigidity of the support device 10.

The transparent member 20, as shown in FIG. 4, includes first and second refractively transmitting portions A1 and A2, which refract light traveling from the front to the rear of the transparent member 20, and first, second, and third straightly transmitting portions B1, B2, and B3, which straightly transmit the light. The first and second refractively transmitting portions A1 and A2 are respectively located in front of the first and second supports 11 and 12. The first straightly transmitting portion B1 is located at the left side of the first refractively transmitting portion A1, the second straightly transmitting portion B2 is located between the first and second refractively transmitting portions A1 and A2, and the third straightly transmitting portion B3 is located at the right side of the second refractively transmitting portion A2.

The front surface of the first refractively transmitting portion A1 is provided with a valley region 23, which coincides with the center of the first support 11, and inclined surfaces 25a and 25b, which are slantingly extended from the valley region 23 respectively to the first and second straightly transmitting portions B1 and B2. These inclined surfaces 25a and 25b may be plane surfaces or curved surfaces having a gradient against the incidence direction of light. In the same manner, the front surface of the second refractively transmitting portion A2 is provided with a valley region 24, which coincides with the center of the second support 12, and inclined surfaces 26a and 26b, which are slantingly extended from the valley region 24 respectively to the second and third straightly transmitting portions B2 and B3.

The transparent member 20 straightly transmits light, which is incident from the front of the transparent member 20 upon the first, second, and third straightly transmitting portions B1, B2, and B3, and refracts light, which is incident from the front of the transparent member 20 upon the first and second refractively transmitting portions A1 and A2, toward external regions of the first and second supports 11 and 12 (regions other than the supports 11 and 12). Thereby, the first and second supports 11 and 12 can be hidden from the user's eyes.

More specifically, light, which is incident from the front of the transparent member 20 upon the first and second supports 11 and 12, is refracted by the inclined surfaces 25a, 25b, 26a, and 26b of the first and second refractively transmitting portions A1 and A2, and travels toward regions other than the first and second supports 11 and 12, i.e., the rear regions of the first, second, and third straightly transmitting portions B1, B2, and B3. Therefore, when a user located in front of the transparent member 20 looks at the transparent member 20, the user can see the rear region of the transparent member 20 (substantially, a wall of a room) except for the first and second supports 11 and 12. Thus, it is possible to hide the first and second supports 11 and 12. That is, the pattern or color of a wall 5 in the rear of the transparent member 20 is seen, as if the first and second supports 11 and 12 do not exist. Further, the transparent member 20, which is made of a transparent material, is not easily exposed to the user's eyes. Therefore, the support device 10 matches well with surrounding environments, and thus improves the beauty of the room. Particularly, since the wires 3 connected to the main body 1 are accommodated in the first and second supports 11 and 12, the wires 3 as well as the first and second supports 11 and 12 can be hidden.

In order to hide the first and second supports 11 and 12, the width of the first and second refractively transmitting portions A1 and A2 should be larger than the width of the first and second supports 11 and 12. Preferably, but not necessarily, the first and second supports 11 and 12 are provided with front ends, which have a streamline shape or a triangular shape, so as not to interfere with light refracted by the first and second refractively transmitting portions A1 and A2. Of course, the first and second supports 11 and 12 can be easily hidden regardless of the shapes of the first and seconds supports 11 and 12 by increasing the width of the first and second refractively transmitting portions A1 and A2 and adjusting the angle of the inclined surfaces 25a, 25b, 26a, and 26b.

Figure 5:
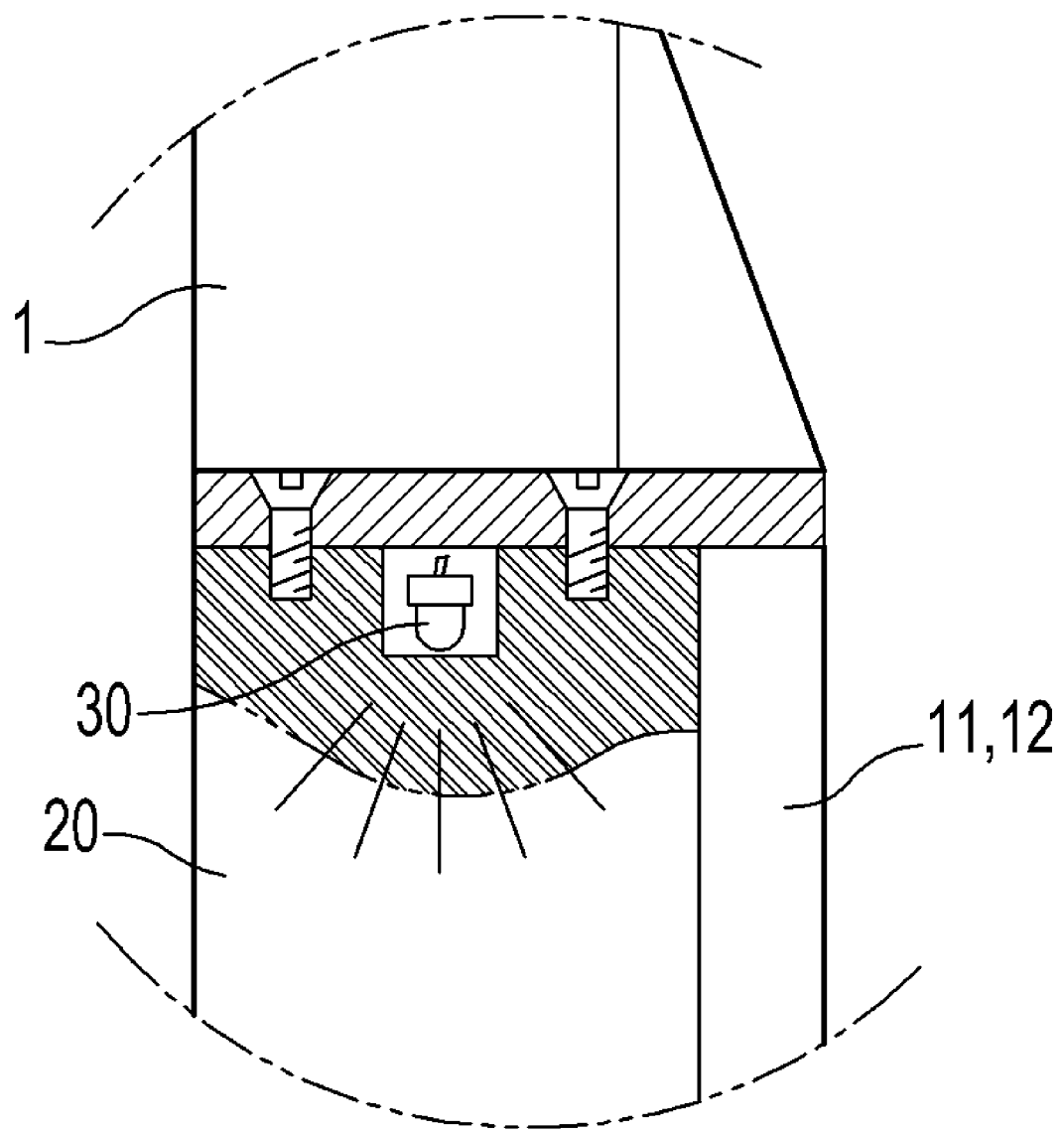
FIG. 5 is an enlarged view of the portion "V" of FIG. 2.

As shown in FIGS. 2 and 5, a luminous body 30 which emits light toward the transparent member 20 is installed at the upper part of the transparent member 20. The luminous body 30 is a light emitting diode (LED) or a small lamp, which emits light when power is applied thereto. The luminous body 30 may irradiate light of various colors onto the transparent member 20, and thus decorates the transparent member 20 as a mood lighting lamp. A user turns on the luminous body 30 by manipulating a separate switch (not shown), if necessary. Although FIG. 2 illustrates the luminous body 30 installed at the upper part of the transparent member 20, the luminous body 30 may be installed at the lower part and the rear surface of the transparent member 20.

Figure 6:
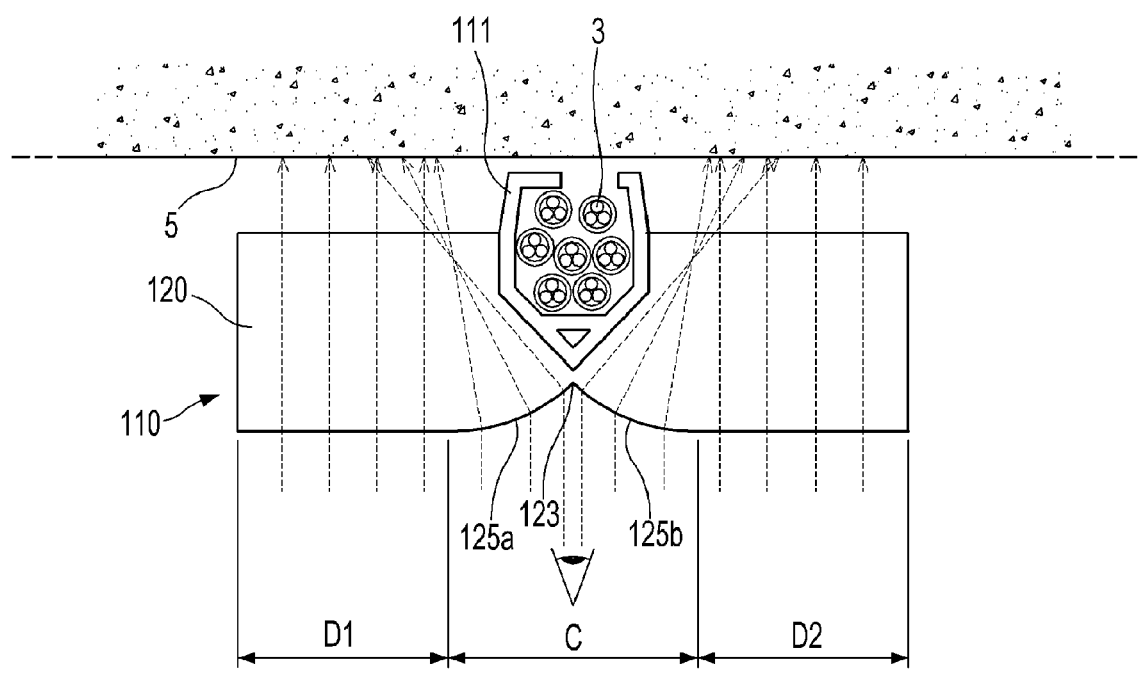
FIG. 6 is a sectional view of a support device for a display unit in accordance with a second embodiment of the present invention.

FIG. 6 is a sectional view of a support device for a display unit in accordance with a second embodiment of the present invention. A support device 110 of this embodiment includes one support 111 for supporting a main body 1 of a display unit, and a transparent member 120 for hiding the support 111. The transparent member 120 includes a refractively transmitting portion C formed at the central region (in front of the support 111), and straightly transmitting portions D1 and D2 formed at both sides of the refractively transmitting portion C. Further, the refractively transmitting portion C is provided with a valley region 123, and inclined surfaces 125a and 125b. Other elements of the support device of the second embodiment are substantially the same as those of the support device of the first embodiment, and a detailed description thereof will be thus omitted for the sake of brevity.

Figure 7:
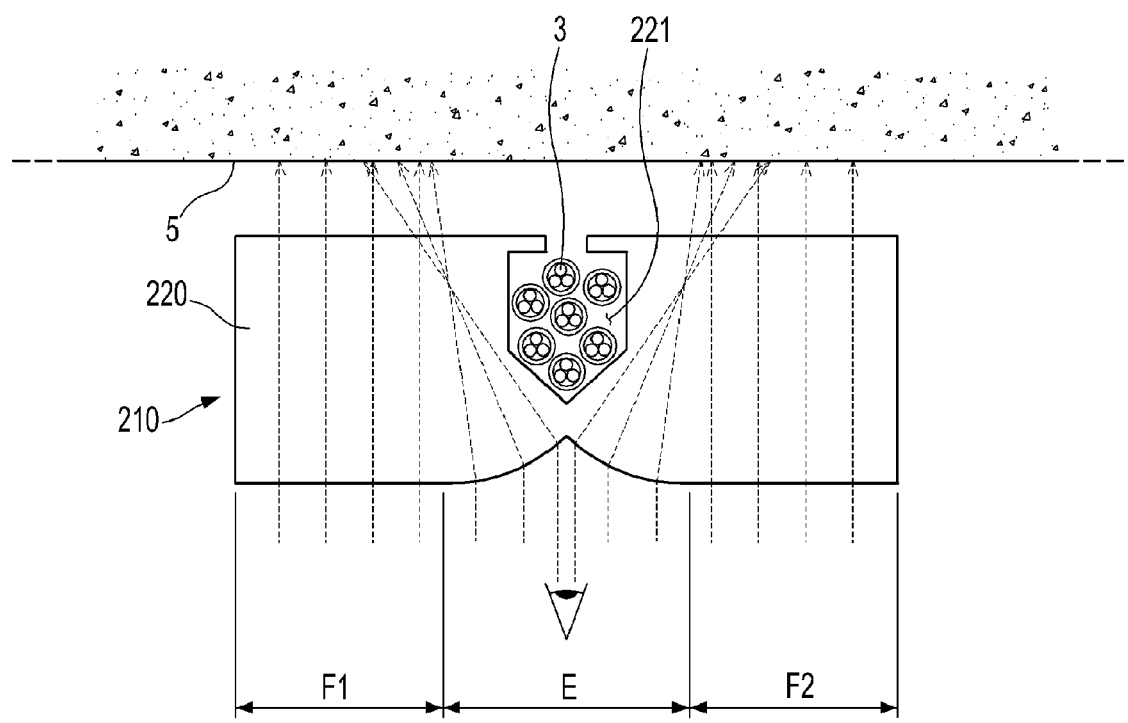
FIG. 7 is a sectional view of a support device for a display unit in accordance with a third embodiment of the present invention.

FIG. 7 is a sectional view of a support device for a display unit in accordance with a third embodiment of the present invention. A support device 210 of this embodiment does not include a separate support, but includes only a transparent member 220 for supporting a main body 1 of a display unit. A pedestal (not shown) for supporting the transparent member 220 is connected to the lower part of the transparent member 220. A wire receiving portion 221 for receiving wires 3 is formed in the central region of the rear surface of the transparent member 220. The transparent member 220 includes a refractively transmitting portion E formed in front of the wire receiving portion 221 for hiding the wire receiving portion 221, and straightly transmitting portions F1 and F2 formed at both sides of the refractively transmitting portion E.

Figure 8:
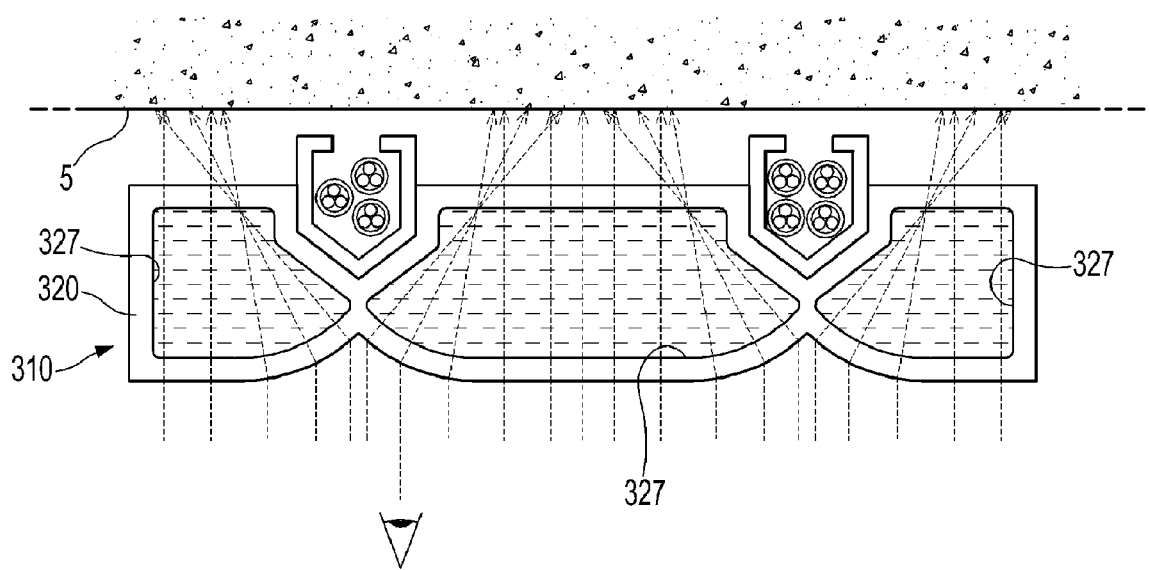
FIG. 8 is a sectional view of a support device for a display unit in accordance with a fourth embodiment of the present invention.

FIG. 8 is a sectional view of a support device for a display unit in accordance with a fourth embodiment of the present invention. A support device 310 of this embodiment includes a hollow liquid containing portion 327 formed in a transparent member 320 for containing a transparent liquid. When the liquid containing portion 327 formed in the transparent member 320 is filled with a transparent liquid, the transparent member 320 looks as if the inside of the transparent member 320 is not empty. Thereby, the material cost of the transparent member 320 is reduced while the transparent member 320 having a large volume is obtained. Other elements of the support device of the fourth embodiment are substantially the same as those of the support device of the first embodiment, and a detailed description thereof will be thus omitted because it is considered to be unnecessary.

Figure 9:
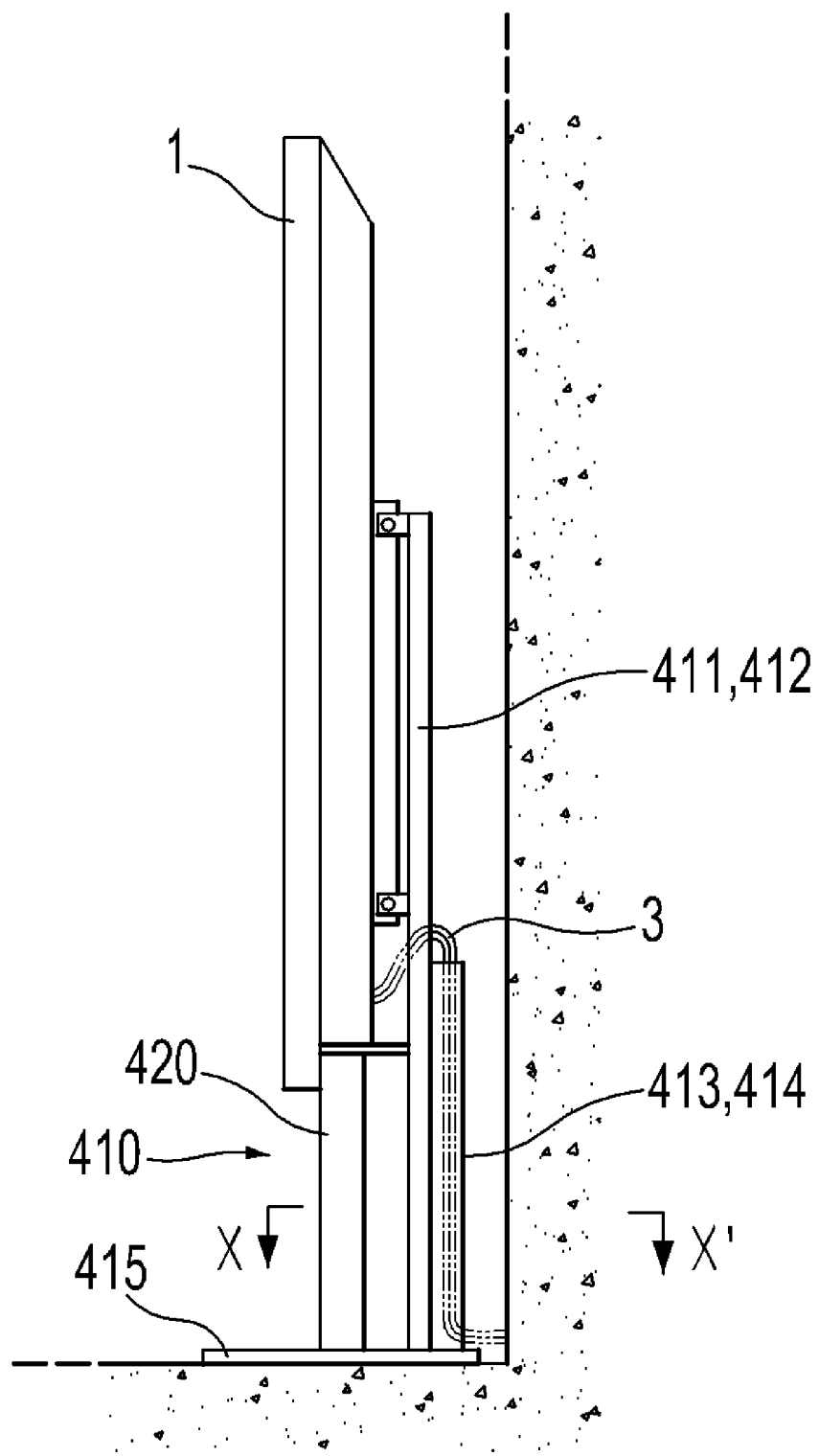
FIG. 9 is a side view of a display unit, to which a support device in accordance with a fifth embodiment of the present invention is applied.
Figure 10:
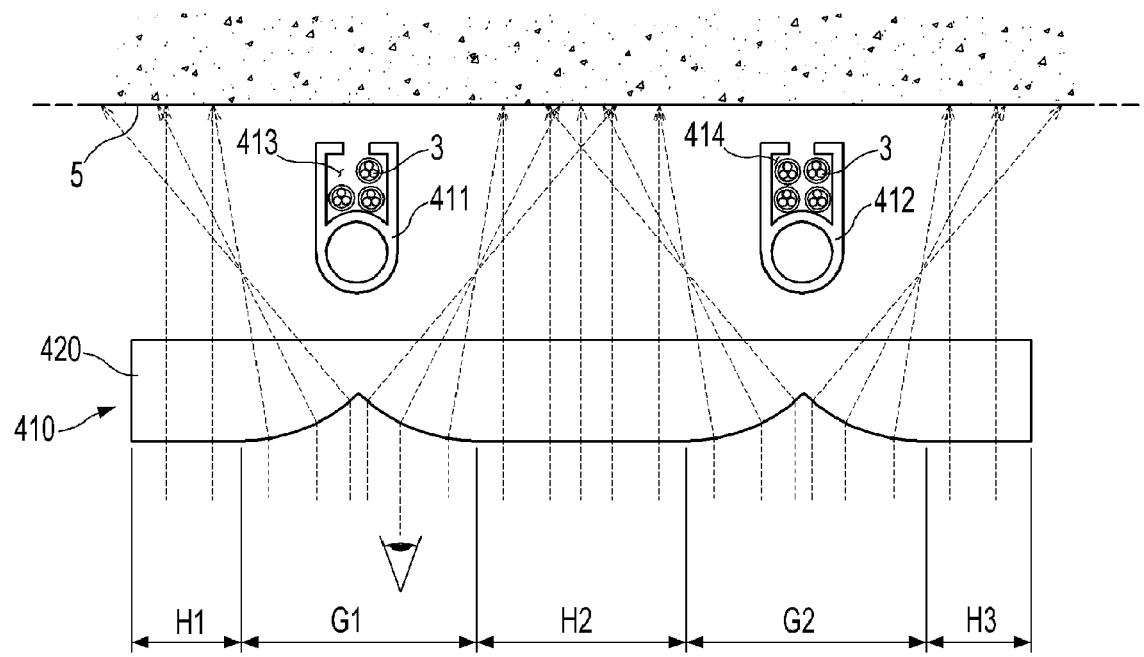
FIG. 10 is a sectional view of FIG. 9 taken along the line X-X'.

FIGS. 9 and 10 illustrate a support device for a display unit in accordance with a fifth embodiment of the present invention. A support device 410 of this embodiment includes first and second supports 411 and 412 installed at both sides for supporting a main body 1 of a display unit, and a transparent member 420 separated from the first and second supports 411 and 412. Upper parts of the first and second supports 411 and 412 are respectively connected to both sides of the rear surface of the main body 1. The transparent member 420 has a length, which corresponds to a distance between the lower end of the main body 1 and a pedestal 415, as shown in FIG. 9, and has a width, which is larger than a distance between the first and second supports 411 and 412. The transparent member 420 includes first and second refractively transmitting portions A1 and A2, which are located in front of the first and second supports 411 and 412 so as to hide the first and second supports 411 and 412. Further, the transparent member 420 includes first, second, and third straightly transmitting portions H1, H2, and H3, which straightly transmit light. Wire receiving portions 413 and 414 for receiving wires 3 are formed in the rear parts of the first and second supports 411 and 412.

Since upper parts of the first and second supports 411 and 412 are more firmly fixed to the rear surface of the main body 1 so as to support the main body 1, the above support device 410 has an advantage of supporting the main body 1 having a heavy weight.

As apparent from the above description, the present invention provides a support device for a display unit, in which refractively transmitting portions of a transparent member refract light, being incident from the front of the transparent member, toward external regions of supports (regions other than the supports), thus hiding the supports from a user's eyes. Therefore, it is possible to improve the beauty of a room.

Since the transparent member is not easily exposed to a user's eyes and projects an image or a wall in the rear of the support device, the support device of the present invention is harmonized with the color and pattern of the surrounding environment.

The support device of the present invention allows wires to be accommodated in the supports or be installed in the rear of the supports so that the wires as well as the supports can be hidden, thus further improving the beauty of the room.

When a luminous body is turned on, the transparent member is illuminated as a mood lighting lamp. Thereby, the transparent member is esthetically decorated.

Although exemplary embodiments of the invention have been shown and described, it would be appreciated by those skilled in the art that changes may be made in these embodiments without departing from the principles and spirit of the invention, the scope of which is defined in the claims and their equivalents.

What is claimed is:

1. A support device for a display unit, comprising:
   at least one support connected to the display unit;
   a base connected to a lower part of the at least one support; and
   a transparent member installed in front of the at least one support, wherein the transparent member includes at least one refractively transmitting portion which refracts light, incident from a front of the transparent member to the at least one support, toward external regions of the at least one support, and wherein the front of the transparent member is shaped so that the light incident from the front of the transparent member is refracted to regions of the transparent member other than the at least one support.

2. The support device according to claim 1, wherein the refractively transmitting portion includes inclined surfaces having a gradient against the direction of the incidence of light.

3. The support device according to claim 1, wherein:
the transparent member further includes straightly transmitting portions for straightly transmitting light incident from the front of the transparent member;
the at least one refractively transmitting portion having a width larger than that of the at least one support is provided in front of the support; and
the straightly transmitting portions are provided at both sides of the at least one refractively transmitting portion.

4. The support device according to claim 3, wherein:
the at least one support includes a first support and a second support, which are provided at separated positions; and
the at least one refractively transmitting portion includes a first refractively transmitting portion and a second refractively transmitting portion, which are respectively provided in front of the first and second supports.

5. The support device according to claim 2, wherein the transparent member further includes a support receiving portion formed in a rear of the at least one refractively transmitting portion so as to accommodate the at least one support.

6. The support device according to claim 1, wherein the at least one support includes a wire receiving portion for receiving wires.

7. The support device according to claim 1, wherein the transparent member further includes a liquid containing portion formed therein for containing a liquid.

8. The support device according to claim 1, further comprising a luminous body installed at one side of the transparent member for irradiating light onto the transparent member.

9. A support device for a display unit comprising:
a transparent member connected to the display unit for supporting the display unit; and
a base installed at a lower part of the transparent member,
wherein the transparent member includes wire receiving portions provided in a rear surface thereof for receiving wires, and refractively transmitting portions which refract light, incident from a front of the transparent member to the wire receiving portions, toward external regions of the wire receiving portions, and
wherein the front of the transparent member is shaped so that the light incident from the front of the transparent member is refracted to regions of the transparent member other than the wire receiving portions.

10. The support device according to claim 9, wherein each of the refractively transmitting portions includes inclined surfaces having a gradient against the direction of the incidence of light.

11. The support device according to claim 9, wherein:
the transparent member further includes straightly transmitting portions for straightly transmitting light incident from the front of the transparent member; and
the straightly transmitting portions are provided at both sides of the refractively transmitting portions.

12. The support device according to claim 9, wherein the transparent member further includes a liquid containing portion formed therein for containing a liquid.

13. The support device according to claim 9, further comprising a luminous body installed at one side of the transparent member for irradiating light onto the transparent member.

14. A display unit comprising:
a main body having a screen; and
a support device which supports the main body, and comprises at least one support connected to the main body, a base connected to a lower part of the at least one support, and a transparent member installed in front of the at least one support,
wherein the transparent member includes at least one refractively transmitting portion which refracts light, incident from a front of the transparent member to the support, toward external regions of the at least one support, and
wherein the front of the transparent member is shaped so that the light incident from the front of the transparent member is refracted to regions of the transparent member other than the at least one support.

15. A display unit comprising:
a main body having a screen; and
a support device which supports the main body, and comprises a transparent member provided with an upper part connected to the main body and a base installed at a lower part of the transparent member,
wherein the transparent member includes wire receiving portions provided in a rear surface thereof for receiving wires, and refractively transmitting portions which refract light, incident from a front of the transparent member to the wire receiving portions, toward external regions of the wire receiving portions, and
wherein the front of the transparent member is shaped so that the light incident from the front of the transparent member is refracted to regions of the transparent member other than the wire receiving portions.

16. A support device for a display unit, the support device comprising:
a transparent member which is connected to the display unit for supporting the display unit, the transparent member being made of a transparent material which can transmit light, wires for transmitting electric signals to the display unit being received in a rear surface thereof, and incident light being refracted at a front surface thereof so that the wires can be hidden; and
a base installed at a lower part of the transparent member,
wherein the front surface of the transparent member is shaped so that the incident light is refracted to regions of the transparent member other than the wires.

17. The support device according to claim 16, wherein the transparent member comprises:
a wire receiving portion provided in the rear surface thereof for receiving wires; and
a refractively transmitting portion provided at the front surface thereof, which refracts light, incident from the front of the transparent member to the wire receiving portion, toward external regions of the wire receiving portion.

18. The support device according to claim 16, wherein the transparent member refracts light incident on an external surface thereof.

19. A display unit comprising:
a main body having a screen;
a member which is connected to and supports the main body, the member being made of a transparent material that can transmit light, wires for transmitting electric signals to the display unit being received in a rear surface of the member, and incident light being refracted at a front surface of the member so that the wires can be hidden; and a base connected to a lower part of the member to support the member, wherein the front surface of the member is shaped so that the incident light is refracted to regions of the member other than the wires.

20. The display unit according to claim 19, wherein the member comprises:

a wire receiving portion provided in the rear surface thereof for receiving wires; and a refractively transmitting portion provided at the front surface thereof, which refracts light, incident from a front of the member to the wire receiving portion, toward external regions of the wire receiving portion.

21. The support device according to claim 1, wherein the transparent member is disposed between the base and the display unit.

22. The display unit according to claim 14, wherein the transparent member is disposed between the base and the main body.

* * * * *